United States Patent
Hamaki et al.

(10) Patent No.: US 11,016,012 B2
(45) Date of Patent: May 25, 2021

(54) INDENTER MADE OF POLYCRYSTALLINE DIAMOND, AND METHOD AND APPARATUS USING THE SAME FOR EVALUATING CRACK INITIATION LOAD

(71) Applicant: Sumitomo Electric Industries, Ltd., Osaka (JP)

(72) Inventors: Kensei Hamaki, Osaka (JP); Katsuko Yamamoto, Osaka (JP); Hitoshi Sumiya, Osaka (JP); Yuh Ishida, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 208 days.

(21) Appl. No.: 16/306,079

(22) PCT Filed: Mar. 29, 2018

(86) PCT No.: PCT/JP2018/013291
§ 371 (c)(1),
(2) Date: Nov. 30, 2018

(87) PCT Pub. No.: WO2019/030970
PCT Pub. Date: Feb. 14, 2019

(65) Prior Publication Data
US 2019/0293536 A1    Sep. 26, 2019

(30) Foreign Application Priority Data

Aug. 10, 2017    (JP) .............................. JP2017-155352

(51) Int. Cl.
*G01N 3/40*    (2006.01)
*G01N 3/42*    (2006.01)
(Continued)

(52) U.S. Cl.
CPC .............. *G01N 3/405* (2013.01); *C01B 32/26* (2017.08); *C04B 35/52* (2013.01); *C04B 35/645* (2013.01);
(Continued)

(58) Field of Classification Search
CPC .............. G01N 3/40–44; G01N 3/405; G01N 2203/0003; G01N 2203/0018;
(Continued)

(56) References Cited

U.S. PATENT DOCUMENTS

| | | | |
|---|---|---|---|
| 1,571,310 A | 2/1926 | Wilson | |
| 5,046,357 A * | 9/1991 | Marston | .................... G01N 3/42 29/428 |

(Continued)

FOREIGN PATENT DOCUMENTS

| | | |
|---|---|---|
| CN | 101523014 A | 9/2009 |
| JP | 2008-180568 A | 8/2008 |

(Continued)

OTHER PUBLICATIONS

"Manual of Artificial Diamond Tools," 1st Edition, Edited by Yueqing Song et al., Published by Metallurgical Industry Press, Jan. 2014, p. 424.

(Continued)

*Primary Examiner* — Nguyen Q. Ha
(74) *Attorney, Agent, or Firm* — Baker Botts L.L.P.; Michael A. Sartori

(57) ABSTRACT

An indenter is made of polycrystalline diamond and has a tip having a spherical surface with a radius of 10 to 2000 μm.

8 Claims, 5 Drawing Sheets

(51) Int. Cl.
*C01B 32/26* (2017.01)
*C04B 35/52* (2006.01)
*C04B 35/645* (2006.01)

(52) U.S. Cl.
CPC ............ *G01N 3/42* (2013.01); *C01P 2004/62* (2013.01); *C04B 2235/421* (2013.01); *C04B 2235/425* (2013.01); *C04B 2235/5454* (2013.01); *C04B 2235/963* (2013.01); *G01N 2203/0003* (2013.01); *G01N 2203/0019* (2013.01); *G01N 2203/0064* (2013.01); *G01N 2203/0078* (2013.01)

(58) Field of Classification Search
CPC ... G01N 2203/0064; G01N 2203/0078; G01N 2203/0019; C04B 35/52; C04B 35/645; C04B 2235/421; C04B 2235/425; C04B 2235/963; C04B 2235/5454; C01P 2004/62; C01B 32/26
See application file for complete search history.

(56) References Cited

U.S. PATENT DOCUMENTS

| | | | | |
|---|---|---|---|---|
| 6,646,748 | B2* | 11/2003 | Nakamura | G01B 11/255 356/513 |
| 9,487,447 | B2* | 11/2016 | Sato | C04B 35/6286 |
| 2005/0154540 | A1* | 7/2005 | Ma | G01N 3/42 702/33 |
| 2016/0216184 | A1* | 7/2016 | Dubois | G01N 3/42 |
| 2016/0282249 | A1* | 9/2016 | Leroux | G01N 3/02 |
| 2017/0074763 | A1* | 3/2017 | Sawa | G01N 3/42 |
| 2018/0029942 | A1* | 2/2018 | Ishida | C04B 35/5831 |
| 2018/0079010 | A1* | 3/2018 | Ishida | B24D 18/0009 |
| 2018/0141818 | A1* | 5/2018 | Yamamoto | B23B 27/20 |

FOREIGN PATENT DOCUMENTS

| | | |
|---|---|---|
| JP | 2013-024649 A | 2/2013 |
| WO | 2008/105915 A2 | 9/2008 |

OTHER PUBLICATIONS

"Modern Instrumental Analysis Experiment and Technology," 1st Edition, Edited by Peirong Chen et al., Published by Tsinghua University Press, Dec. 1999, pp. 335-341.
Notification of the First Office Action issued in counterpart Chinese Patent Application No. 201880002995.1 dated Feb. 5, 2021.

* cited by examiner

| GRAIN SIZE | 30~50nm | 50~100nm |
|---|---|---|
| CUTTING EDGE OF TOOL AFTER CUTTING |  |  |
| CRACK INITIATION LOAD | 33N | 24N | ns
INDENTER MADE OF POLYCRYSTALLINE DIAMOND, AND METHOD AND APPARATUS USING THE SAME FOR EVALUATING CRACK INITIATION LOAD

TECHNICAL FIELD

The present invention relates to an indenter made of polycrystalline diamond, and a method and apparatus using the same for evaluating a crack initiation load. The present application claims priority based on Japanese Patent Application No. 2017-155352, filed on Aug. 10, 2017. The contents described in the Japanese patent application are all incorporated herein by reference. Further, the present invention is applied to a field of diamond tools, a field of optics, a field of substrates for semiconductor, and so forth.

BACKGROUND ART

As there is a demand for miniaturization, high accuracy and high efficiency of electronic devices and optical components, there is an increasing demand for high precision processing of high hardness materials, and accordingly, there is an increasing demand for tool materials having high strength and high hardness.

CITATION LIST

Patent Literature

[Patent Literature 1] Japanese Patent Laying-Open No. 2008-180568

SUMMARY OF INVENTION

One aspect of the present disclosure provides an indenter made of polycrystalline diamond and having a tip having a spherical surface with a radius of 10 to 2000 μm.

Another aspect of the present disclosure provides a method for evaluating a load which cracks a test piece including a hard material having a diamond-like crystal structure, comprising the steps of:

fixing the test piece at a predetermined location and bringing a tip of the indenter into contact with a surface of the test piece;

applying a load increasing with time to the indenter in a direction perpendicular to the surface of the test piece toward the surface of the test piece; and recording a load applied when the test piece has the surface cracked by the indenter.

Still another aspect of the present disclosure provides an evaluation apparatus for evaluating a load which cracks a test piece including a hard material having a diamond-like crystal structure, comprising:

the above indenter;

a test table allowing a test piece including a hard material having a diamond-like crystal structure to be fixed thereto at a predetermined location;

a load application unit configured to apply a load increasing with time to the indenter in a direction perpendicular to a surface of the test piece toward the surface of the test piece;

a detector configured to detect a frequency spectrum of oscillation of the test piece; and a recorder configured to record the load and the frequency spectrum.

DETAILED DESCRIPTION

Figure 1:
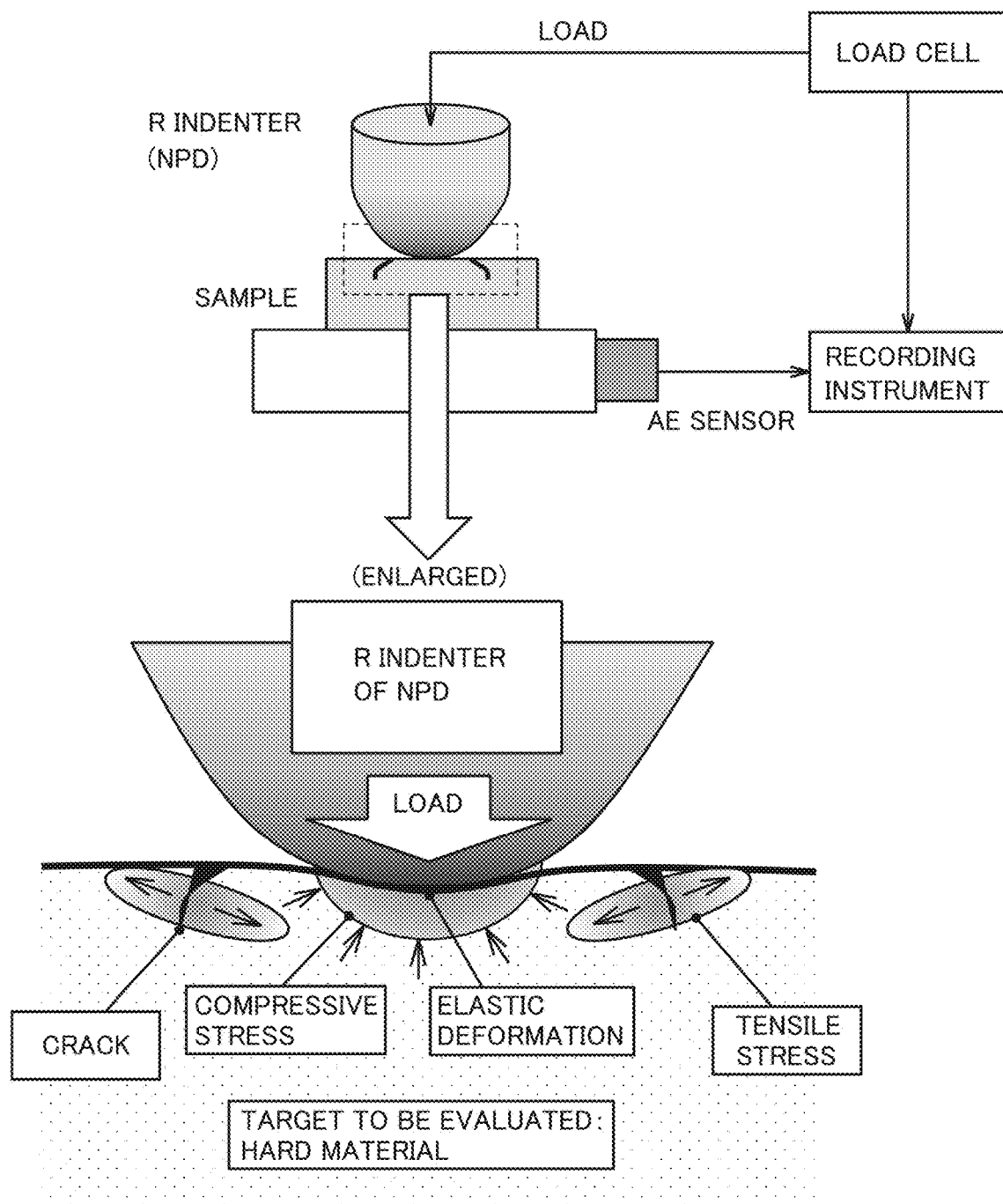
FIG. 1 is a schematic view of an evaluation apparatus for evaluating a load which cracks a test piece including a hard material having a diamond-like crystal structure according to an embodiment.

Problem to be Solved by the Present Disclosure

Cracking the hardest material in the world such as diamond (hereinafter also referred to as a "hard material") to evaluate the hard material in hardness and durability against fracture such as cracking has been significantly difficult as doing so has required an indenter of a material harder than the material to be evaluated. Further, when an indenter having a degree of hardness slightly larger than the material to be evaluated is used, a value in durability against fracture (for example, a crack initiation load described later) is not reliable, and the indenter also has low durability (that is, it is not used many times) and needs to be replaced frequently.

For example, in evaluating ceramics such as oxides and nitrides in hardness and the like, an indenter of diamond single crystal has been used. While the indenter of diamond single crystal is much higher in hardness than ceramics, the former has a difference in hardness depending on the crystal plane orientation, and easily cleaves and thus has a problem in durability. In evaluating diamond-based materials (diamond-like carbon (DLC), cubic boron nitride (cBN), single crystal diamond, etc.), the subject to be evaluated is a significantly hard material, and measurement per se has been difficult. Furthermore, the indenter was broken or the like during measurement and reliable measurement was unable to be done.

It is known that durability against fracture is measured by measuring Vickers hardness and Knoop hardness. An indenter for measuring Vickers hardness and Knoop hardness has been required to be a sharp pyramidal indenter. However, the sharp pyramidal indenter was unsuitable for evaluation of the diamond-based material indicated above.

The present invention has been made in view of the above circumstances, and an object thereof is to provide an indenter allowing a reliable evaluation of a hard material in durability against fracture, and a method and apparatus using the indenter for evaluating a crack initiation load.

Advantageous Effect of the Present Disclosure

According to the present disclosure, there can be provided an indenter allowing reliable evaluation of a hard material in durability against fracture, and a method and apparatus using the indenter for evaluating a crack initiation load.

Description of Embodiments of the Present Invention

The present inventors have conducted a diligent study and as a result found that an indenter made of polycrystalline diamond such as a binder-free nano-polycrystalline diamond, and having a tip partially processed to have a specific spherical surface is suitable for evaluating a hard material in durability against fracture. In addition, the present inventors have found that applying a load which increases with time to a hard material serving as a test piece via the indenter, and determining a load applied when the test piece has a surface cracked, allow durability against fracture to be reliably evaluated. The indenter with a tip having a precisely spherical surface allows force to be applied uniformly and a burden on the indenter is also reduced. This allows even a test piece identical in quality to the indenter to be also reliably evaluated in durability against fracture. The present evaluation method has been implemented by processing a polycrystalline diamond considered to be the hardest in the world, such as a binder-free nano polycrystalline diamond, to have a spherical surface with high precision to be an indenter.

[1] According to one aspect of the present disclosure, an indenter is made of polycrystalline diamond and has a tip having a spherical surface with a radius of 10 to 2000 μm. The indenter enables reliable evaluation of a hard material in durability against fracture.

[2] The spherical surface of the tip is a portion with a roundness of 0.001 μm or more and 0.05 μm or less. This further improves precision and reproducibility of measurement.

[3] The spherical surface of the tip is a portion with a surface roughness Ra of 0.0001 μm or more and 0.03 μm or less. This further improves precision and reproducibility of measurement.

[4] The polycrystalline diamond further includes boron. This allows efficient and highly precise processing.

[5] The proportion of the boron is 100 ppm or more and less than 10000 ppm. This allows efficient and highly precise processing.

[6] According to another aspect of the present disclosure, a method for evaluating a crack initiation load is a method for evaluating a load which cracks a test piece including a hard material having a diamond-like crystal structure, comprising the steps of:

fixing the test piece at a predetermined location and bringing a tip of the indenter into contact with a surface of the test piece;

applying a load increasing with time to the indenter in a direction perpendicular to the surface of the test piece toward the surface of the test piece; and recording a load applied when the test piece has the surface cracked by the indenter.

The present method enables reliable evaluation of a hard material in durability against fracture.

[7] The hard material includes diamond or cubic boron nitride. The present method is suitably applicable to a hard material including diamond or cubic boron nitride.

[8] The present method further comprises, in the step of applying a load to the indenter, detecting a frequency spectrum of oscillation of the test piece, and further comprises, in the step of recording the load, removing a signal of a noise component, based on a frequency of a threshold preset in order to separate a signal attributed to cracking and a signal attributed to the noise component, to detect and record the signal attributed to cracking. This allows a crack initiation load to be easily and precisely known.

[9] According to still another aspect of the present disclosure, an evaluation apparatus comprises:

the above indenter;

a test table allowing a test piece including a hard material having a diamond-like crystal structure to be fixed thereto at a predetermined location;

a load application unit configured to apply a load increasing with time to the indenter in a direction perpendicular to a surface of the test piece toward the surface of the test piece;

a detector configured to detect a frequency spectrum of oscillation of the test piece; and a recorder configured to record the load and the frequency spectrum.

The present evaluation apparatus enables reliable evaluation of a hard material in durability against fracture.

Details of Embodiments of the Present Invention

While an embodiment of the present invention will be described hereinafter, the present invention is not limited thereto. In the present specification, an expression in the form of "A–B" means a range's upper and lower limits (that is, A or more and B or less), and when A is not accompanied by any unit and B is alone accompanied by a unit, A has the same unit as B.

(Indenter Made of Polycrystalline Diamond)

An indenter according to the present embodiment is an indenter made of polycrystalline diamond, and the indenter has a tip having a spherical surface with a radius of 10 to 2000 μm.

Polycrystalline diamond such as binderless nano-polycrystalline diamond is significantly hard and has no property for cleavage, and it is thus an optimal material. Therefore, the present inventors first examined using this material as an indenter (Japanese Patent Laid-Open No. 2008-180568 (Patent Literature 1)). However, polycrystalline diamond is significantly hard, and it is thus difficult to produce an indenter therefrom. In particular, indenters such as Vickers indenter and Knoop indenter need to have their tips sharply processed. Thus processing such an indenter's tip sharply, however, has been very difficult for polycrystalline diamond that is a hard material. The present inventors have conducted a diligent study and as a result found that an indenter made of polycrystalline diamond such as binderless nano-polycrystalline diamond and having a tip partially processed to have a specific spherical surface is suitable for evaluating a hard material in durability against fracture.

That is, the indenter according to the present embodiment, that has the above configuration, allows reliable evaluation of a hard material serving as a test piece in durability against fracture. Applying a load which increases with time to the test piece via the indenter and determining a load applied when the test piece has a surface cracked allow durability against fracture to be evaluated. Therefore, a reliable numerical value can be obtained without breaking the indenter, and evaluation can thus be done.

In the present embodiment, "polycrystalline diamond" means a polycrystal of single-phase diamond." Note, however, that in the present embodiment, "polycrystalline diamond" also includes that having a diamond crystal structure having carbon atoms partially replaced with boron atoms or other similar atoms other than carbon atoms, and that having a diamond crystal structure having carbon atoms with an atom other than a carbon atom inserted therebetween. That is, in the present embodiment, polycrystalline diamond also includes polycrystalline diamond further including boron. Examples of polycrystalline diamond include binder-free polycrystalline diamond (binderless polycrystalline diamond), nano polycrystalline diamond, binder-free nano polycrystalline diamond (a binderless nano polycrystalline diamond), and the like. The polycrystalline diamond can be produced, for example, in the method described in Patent Literature 1. Specifically, by converting non-diamond carbon such as graphite, glassy carbon, amorphous carbon and the like directly to diamond under ultrahigh pressure at ultrahigh temperature without a catalyst or a solvent, and simultaneously sintering it, a binder-free polycrystalline diamond can be obtained. Hereinafter, it will be described hereinafter in detail.

For example, a non-graphitic carbon material is added in an appropriate amount to a plate-shaped graphite having a grain size of 50 nm or more or diamond having a grain size of 50 nm or more. This, serving as a raw material composition, is converted directly into diamond and also sintered under a pressure under which diamond is thermodynamically stable (for example, 12 GPa or more). Then, polycrystalline diamond is obtained which has a structure in which relatively coarse diamond for example of 100 to 200 nm is dispersed in a matrix of very fine diamond having an average grain size for example of 10 to 20 nm. Plastic deformation or development of cracking is prevented by a relatively coarse diamond portion, so that significant toughness and high hardness properties are exhibited, and each polycrystalline diamond obtained also has a property with significantly reduced variation.

Herein, the non-graphitic carbon material is added preferably in an amount of 10 vol % to 95 vol % to the plate-shaped graphite or diamond having a grain size of 50 nm or more. If it is added in an amount less than 10% by volume, layers or coarse grains of diamond come into contact with each other and stress concentration occurs at their interface and tends to cause fracture or cracking, which is not preferable. If it is added in an amount exceeding 95% by volume, an effect of layers or coarse grains of diamond to prevent plastic deformation or development of fine cracking is insufficient.

Examples of the non-graphitic carbon material include glassy carbon, amorphous carbon, fullerene, carbon nanotube, and the like. Further, fine carbon having a grain size of 50 nm or less obtained by mechanically pulverizing graphite with a planetary ball mill or the like can also be used.

A mixture obtained as described above is introduced into a capsule of metal such as Mo. When pulverized fine carbon is used, it is necessary to introduce the mixture into the capsule in a highly pure inert gas. Subsequently, an ultrahigh-pressure and ultrahigh-temperature generator capable of isotropic pressing or isostatic pressing, such as a multi-anvil type ultrahigh pressure apparatus and a belt type ultrahigh pressure apparatus, was used to hold the mixture at a temperature of 1500° C. or higher under a pressure under which diamond is thermodynamically stable (for example, 12 to 18 GPa) for a predetermined period of time (for example, 20 to 24 hours). The non-graphitic carbon is directly converted into diamond and sintered at the same time. When the plate-shaped graphite having a grain size of 50 nm is used, it is necessary to treat it at a high temperature of 2000° C. or higher (2200° C. or lower) in order to completely convert it into diamond.

In this way, a polycrystalline diamond having a structure in which laminar or relatively coarse diamond crystals are dispersed in a matrix of fine grains of diamond can be reliably obtained.

Further, when performing the above high pressure and high temperature treatment with graphite serving as a starting material, a heating rate set to 100 to 1000° C./min. also allows a polycrystalline diamond having a similar structure to be obtained.

The polycrystalline diamond thus obtained has a structure having fine-grained diamond crystal and plate-shaped or particulate coarse-grained diamond crystal mixed together. Such a polycrystalline diamond prevents plastic deformation, development of cracking, and the like by an effect that the plate-shaped or particulate coarse-grained diamond crystal has to prevent plastic deformation or development of fine cracking. Therefore, the above polycrystalline diamond exhibits significantly tough and high hardness characteristics and also significantly reduces variation between samples in characteristics.

It is preferable that the fine-grained diamond crystal have a maximum grain size of 100 nm or less and an average grain size of 50 nm or less. When the fine-grained diamond crystal has a grain size exceeding the above value, the polycrystalline diamond tends to be decreased in hardness or strength. In another aspect of the present embodiment, the fine-grained diamond crystal may have a minimum grain size of 3 nm or more and an average grain size of 5 nm or more.

The indenter is not limited in shape insofar as it has a tip having a specific spherical surface. For example, the indenter may be spherical or conical. Furthermore, the indenter may be in the form of a Rockwell indenter. The indenter with a tip having a specific spherical surface allows force to be applied uniformly at a portion where the tip of the indenter is in contact with the surface of the test piece, and a burden on the indenter is also reduced. This allows even a test piece identical in quality to the indenter to be also reliably evaluated in durability against fracture. The indenter preferably has a tip having a spherical surface at least in a range in which the tip comes into contact with the test piece or at a solid angle of several times of that range.

The spherical surface preferably has a radius of 10 to 2000 μm, preferably 10 to 200 μm. When the indenter is used to measure a test piece including a diamond material, the spherical surface more preferably has a radius of 20 μm to 100 μm, still more preferably 30 μm to 80 μm. The radius of the spherical surface can be measured with, for example, a shape analyzing laser microscope (a confocal laser microscope). More specifically, the radius of the spherical surface can be measured as follows: Initially, a shape analyzing laser microscope is used to perform 3D measurement of the tip of the indenter to obtain data of a cross section of the tip of the indenter. Subsequently, a measurement function included in the shape analyzing laser microscope is used to analyze data of cross sections in four directions and determine a maximum value as the radius of the spherical surface. The shape analyzing laser microscope is, for example, VK-8700 and VK-X 250 manufactured by Keyence Corporation.

When a test piece including a diamond material is measured using an indenter having a spherical surface with a radius of 20 μm or less, the indenter tends to cause plastic deformation during the evaluation. When a test piece including a diamond material is measured using an indenter having a spherical surface with a radius of 80 μm or more, there is a tendency to require an increased load to crack the test piece and require the surface to have further high surface precision.

Figure 5:
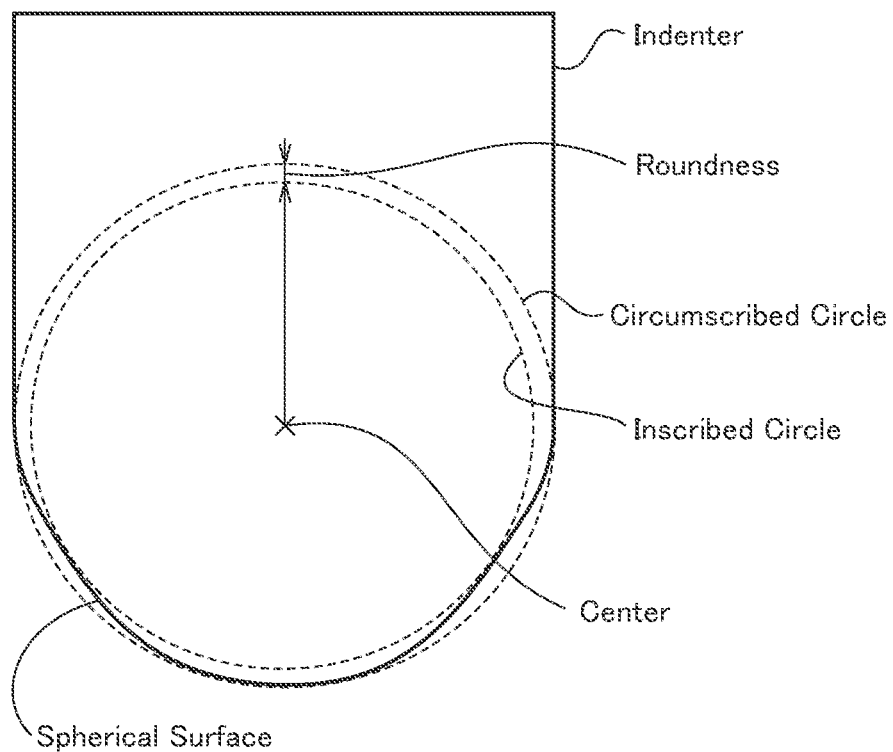
FIG. 5 is a cross-sectional view of an indenter for measuring roundness of a tip of the indenter.

The indenter has a tip having a spherical surface portion with a roundness preferably of 0.05 μm or less, more preferably 0.03 μm or less from the viewpoint of more reliable evaluation. The roundness thus set allows a test piece and the indenter to come into contact along a uniform surface and the test piece to receive a uniform load. This further improves precision and reproducibility of measurement. Although the roundness's lower limit is not particularly limited, it may be 0.001 μm or more, or may be 0.005 μm or more, from the viewpoint of manufacturing the indenter. The roundness can be measured with, for example, a shape analyzing laser microscope (a confocal laser microscope). More specifically, the roundness can be measured as follows: Initially, a shape analyzing laser microscope is used to perform 3D measurement of the tip of the indenter to obtain data of a cross section of the tip of the indenter, as shown in FIG. 5. Subsequently, from the data of the cross section obtained, center coordinates are obtained using least squares, and a difference between a circumscribed circle and an inscribed circle for the data of the cross section is determined to obtain roundness (JIS B 0621). The shape analyzing laser microscope is, for example, VK-8700 and VK-X 250 manufactured by Keyence Corporation.

The indenter has a tip having a spherical surface portion with a surface roughness Ra preferably of 0.03 μm or less, more preferably 0.005 μm or less, from the viewpoint of more reliable evaluation. Surface roughness Ra thus set allows a test piece and the indenter to come into contact along a uniform surface. This further improves precision and reproducibility of measurement. Furthermore, it also allows the indenter to have an increased lifetime. Although surface roughness Ra has a lower limit which is not particularly limited, it may be 0.0001 μm or more from the viewpoint of manufacturing the indenter. Surface roughness Ra can be measured with, for example, a shape analyzing laser microscope (a confocal laser microscope). More specifically, surface roughness Ra can be measured as follows: Initially, a shape analyzing laser microscope is used to perform 3D measurement of the tip of the indenter to obtain data of a cross section of the tip of the indenter. Subsequently, from the obtained 3D data, surface roughness Ra is obtained by using a surface roughness measuring function provided in the shape analyzing laser microscope. The measurement is conducted through a procedure which corresponds to ISO 25178. The shape analyzing laser microscope is, for example, VK-X 250 manufactured by Keyence Corporation.

In order to manufacture the indenter, polishing on a polishing disc with #3000 or more is preferable. It is preferable that the polishing disc and a polishing machine have high rigidity. For example, the polishing disc is preferably a hard polishing disc such as PCD (polycrystalline diamond). Further, preferably the polishing machine suppresses vibration and distortion of the polishing disc's rotary shaft and polishing arm to be small.

In the indenter of the present embodiment, the polycrystalline diamond preferably further includes boron. The polycrystalline diamond including boron can have electrical conductivity. When it is processed using electric power, such as electric discharge machining, it can be processed efficiently with high precision.

The proportion of the boron is preferably 100 ppm or more and less than 10000 ppm. When the proportion of the boron is less than 100 ppm the polycrystalline diamond tends to pass a current less easily. When the proportion of the boron is 10000 ppm or more, the polycrystalline diamond tends to be decreased in hardness. The proportion of the boron is more preferably 100 ppm or more and less than 6000 ppm, still more preferably 100 ppm or more and less than 2000 ppm. The proportion of the boron can be measured, for example, by secondary ion mass spectrometry (SIMS).

A more preferable method for manufacturing the indenter according to the present embodiment is for example as follows: a polycrystalline diamond being equivalent in hardness to a polycrystalline diamond which does not include boron and doped with boron (with the boron having a proportion of 4000 ppm or less) is used to manufacture the indenter by a combination of electric discharge machining and polishing.

(Method for Evaluating Crack Initiation Load)

A method for evaluating a load which cracks a test piece including a hard material having a diamond-like crystal structure according to the present embodiment comprises the steps of:

fixing the test piece at a predetermined location and bringing a tip of the indenter according to the present embodiment into contact with a surface of the test piece;

applying a load increasing with time to the indenter in a direction perpendicular to the surface of the test piece toward the surface of the test piece; and recording a load applied when the test piece has the surface cracked by the indenter.

The evaluation method according to the present embodiment that includes the above process can obtain a numerical value of a breaking load (or a crack initiation load) which is reliable, and can dispense with continuing to apply an unnecessary load to the indenter and can thus timely stop applying a load to the indenter. This can dramatically increase the indenter's stability and lifetime. Herein, a "crack initiation load" means a load applied when a test piece to be evaluated has a surface cracked while the load is applied to the test piece via an indenter over time. Examples of the "hard material having a diamond-like crystal structure" include diamond, cubic boron nitride (cBN), and the like, and more specifically, polycrystalline diamond such as nano polycrystalline diamond (NPD), and polycrystalline cBN such as nano polycrystalline cBN. Each step will be described below.

(Step of Bringing the Tip of the Indenter into Contact with a Surface of the Test Piece)

In this step, there is no particular limitation other than using the indenter according to the present embodiment. For example, insofar as the tip of the indenter can appropriately be brought into contact with a surface of the test piece, it may be done so at any location on the surface of the test piece, although it is preferably done so on the surface of the test piece at the center of gravity. How the test piece is fixed is not particularly limited, either.

(Step of Applying a Load Increasing with Time to the Indenter in a Direction Perpendicular to the Surface of the Test Piece Toward the Surface of the Test Piece)

In this step, a load is applied to the indenter in a direction perpendicular to the surface of the test piece toward the surface of the test piece. Thus setting the load applied to the indenter allows a crack initiation load to be measured reliably and reproducibly. The indenter's lifetime can also be increased. The "perpendicular direction" does not necessarily mean 90° and it may be in a range of 85° to 95°. In addition, this step can also be understood as the step of applying a load which increases with time to the surface of the test piece via the indenter.

In this step, the load applied to the indenter increases with time. While the load applied to the indenter is increased at a rate in a range without any particular limitation applied thereto, the rate is for example 0.1 to 100 N/s, and it may be 0.1 to 1 N/s or may be 1 to 100 N/s.

(Step of Recording a Load Applied when the Test Piece has the Surface Cracked by the Indenter)

In this step, there is no particular limitation applied to how a "load applied when the test piece has the surface cracked"

(that is, a crack initiation load) is determined. For example, a load applied when a signal of a frequency unique to a material of the test piece that is emitted when the test piece has the surface cracked is sensed by an acoustic emission sensor (an AE sensor) set on a test table on which the test piece is fixed may be recorded as a crack initiation load. While the AE sensor used is not particularly limited, it is for example an AE sensor having a resonant frequency of 200 to 500 kHz.

The present inventors have actually conducted a test, and found that a crack initiation load can be easily and precisely known by detecting a frequency of oscillation of the test piece when the test piece has the surface cracked. In other words, the evaluation method according to the present embodiment further comprises, in the step of applying a load to the indenter, detecting a frequency spectrum of oscillation of the test piece, and further comprises, in the step of recording the load, removing a signal of a noise component, based on a frequency of a threshold preset in order to separate a signal attributed to cracking and a signal attributed to the noise component, to detect and record the signal attributed to cracking.

Further, the evaluation method according to the present embodiment may be performed by an evaluation apparatus described hereinafter.

(Evaluation Apparatus)

An evaluation apparatus for evaluating a load which cracks a test piece including a hard material having a diamond-like crystal structure according to the present embodiment comprises:

the indenter according to the present embodiment;

a test table allowing a test piece including a hard material having a diamond-like crystal structure to be fixed thereto at a predetermined location;

a load application unit configured to apply a load increasing with time to the indenter in a direction perpendicular to a surface of the test piece toward the surface of the test piece;

a detector configured to detect a frequency spectrum of oscillation of the test piece; and a recorder configured to record the load and the frequency spectrum.

FIG. 1 is a schematic view of the evaluation apparatus for evaluating a load which cracks the test piece including the hard material having the diamond-like crystal structure according to the present embodiment.

Figure 2:
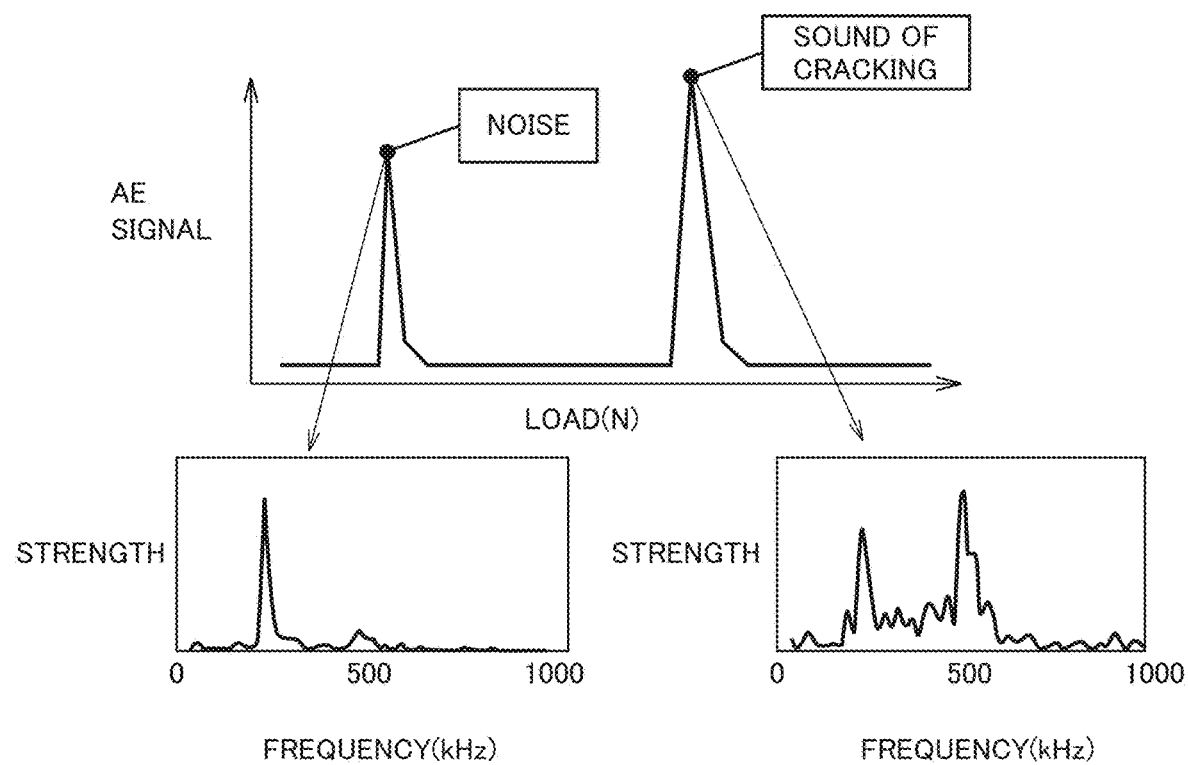
FIG. 2 is a graph representing an example of an analysis of a frequency of an AE signal for a test piece.

In FIG. 1, an R indenter, which is the indenter according to the present embodiment, receives a load applied thereto in a direction perpendicular to a surface of the test piece toward the surface of the test piece by a load cell (a load application unit) controlling the load to increase it with time. The data of the load applied to the R indenter is recorded in a recording instrument (a recorder) which records the load and a frequency spectrum from the load cell. An AE sensor (a detector) which detects a frequency spectrum of oscillation of the test piece including the hard material having the diamond-like crystal structure detects a frequency spectrum of oscillation (or an acoustic signal) of the test piece fixed to a sample stage (or a test table) which allows the test piece to be fixed thereto at a predetermined location. The data of the frequency spectrum is recorded in the recording instrument. When the test piece cracks, a signal is emitted at a frequency unique to a material of the test piece, and by analyzing a frequency of the acoustic signal measured by the AE sensor, for example, a noise can be separated from a signal as shown in FIG. 2 to determine a signal derived from cracking and also determine a load applied when the test piece cracks.

EXAMPLES

Hereinafter, the present invention will further specifically be described with reference to examples, however, the present invention is not limited thereto.

Example 1

(Preparing the Indenter)

A raw material composition including 50% by volume of plate-shaped graphite having a grain size of 50 nm or more and 50% by volume of glassy carbon was held under a pressure of 12 GPa at a temperature of 2000° C. for 20 hours to obtain a binder-free nano-polycrystalline diamond. The obtained nano-polycrystalline diamond was processed into a column of 1 mm square and 3 mm long. The column had a surface processed with a parallelism within 0.5°. The column had a tip polished to have a pyramidal shape. A more rigid polishing machine was used to rotate and press the pyramidal polycrystalline diamond against a polishing disc which was a substrate of sintered polycrystalline diamond having a grain size of 0.3 μm or less and processed to be flat so as to have a Ra of 10 nm or less. By gradually tilting an angle between the polishing disc and the nano-polycrystalline diamond from 0° to 30°, a portion of the tip having an opening angle of 20° was formed to have a spherical surface. Through the above process, an indenter made of polycrystalline diamond was produced. The obtained indenter was measured with a shape analyzing laser microscope. The indenter had a tip having a spherical surface portion with a radius of 47.8 m and a roundness of 0.038 μm. The spherical surface portion had a surface roughness Ra of 0.028 μm.

(Preparing a Test Piece)

As a test piece, plate materials of diamond and cubic boron nitride (cBN) as a hard material were prepared and polished to have a surface roughness Ra<2 nm.

(Measurement Procedure)

A test piece was fixed on a sample stage at a predetermined location and the tip of the indenter had the spherical surface portion brought into contact with a surface of the test piece perpendicularly (within a range of 90°±5°). Subsequently, a load increasing with time within a range of 0.1 to 100 N/s was applied to the indenter in a direction perpendicular to the surface of the test piece toward the surface of the test piece. In doing so, the AE sensor provided on the sample stage was used to obtain a frequency spectrum when the load was applied.

For a test piece having a surface roughness Ra>2 nm, partial contact had a large effect and a result of measurement obtained was not reproducible. The present inventors consider that when the indenter does not come into contact with the surface of the test piece perpendicularly, a measurement result is provided which is not reproducible due to a tangential force generated at the surface of the test piece.

Subjecting the test piece while measured to frequency-sampling with an AE sensor which has a resonant frequency of 200 to 500 kHz and performing fast Fourier transformation analysis (FFT analysis) allowed a crack initiation load to be determined more precisely. It has been found that in the case of NPD and single crystal diamond, when cracking occurs, damped oscillation of 300 to 500 kHz is caused.

In the case of synthetic single crystal diamond having a nitrogen content of less than 300 ppm, only when oscillation of 300 kHz or more occurred, a sample cracked, with a crack initiation load indicating a value of 14±2 N. In the case of NPD as well, only when oscillation of 300 kHz or more occurred, cracking occurred, with a crack initiation load indicating a value of 9±1.5 N.

An evaluation method using the indenter according to the present embodiment makes it possible to evaluate a crack initiation load with high precision even for a test piece including a hard material. This allows a material suitable for a tool, an optical material without cracking or chipping after processed, and a substrate for semiconductor after a planarization process to be provided. Furthermore, it can reduce a cost of or labor for a finished product (a product which is defective after processed immediately before finished would waste the so far performed steps and result in an increased cost). In addition, the indenter according to the present embodiment can also be used as a tool or an electrode requiring similarly high precision, and are effective.

Example 2

1. Introduction

As there is a demand for miniaturization, high accuracy and high efficiency of electronic devices and optical components, there is an increasing demand for high precision processing of high hardness materials (that is, hard materials), and accordingly, there is an increasing demand for tool materials having high strength and high hardness. Conventionally, single crystal diamond has been used for cutting tools for super precision processing. Recently, hard and robust nano-polycrystalline diamond (NPD) and nano-polycrystalline cBN (BL-PcBN) have been developed by a direct conversion method under ultra high pressure at ultra high temperature (HPHT). They do not include any binder or any sintering aid, and have a fine structure having high strength with a grain size of several tens nanometers. They allow processing of a highly strong and precise cutting edge, and hence allow a difficult-to-cut material to be cut with high precision. These nano-polycrystalline materials synthesized by direct conversion have different grain sizes or different grain boundary strengths depending on the starting material(s) or the synthesizing condition(s), and present significantly different properties as materials. Therefore, it is important to quantitatively evaluate a difference in mechanical property or tool performance depending on the manufacturing process. In the case of diamond/cBN material having high strength and high hardness, however, it is extremely difficult to accurately measure material strength. Transverse rupture strength measurement used to evaluate strength for a ceramic material or a metal material needs to be done in a state with a sample having a surface processed without damage. However, in the case of diamond/cBN material, it is significantly difficult to prepare a sample without damage through processing, and it is significantly difficult to obtain accurate transverse rupture strength measurement. Accordingly, a novel strength evaluation technique has been developed based on an indentation test using an R indenter based on Hertz contact theory. By using high-strength and isotropic NPD as an indenter, a reliable strength evaluation can be done without the indenter damaged by cleavage, as compared with a single-crystal indenter. This measurement technique was used to evaluate BL-PcBN, NPD, and in addition, a variety of types of single crystal diamonds, and other similar various types of hard materials in strength. Furthermore, a relationship between these results and cutting performance was examined.

2. Novel Strength Test Method

FIG. 1 shows a schematic diagram of a novel strength test method presently developed. As an R indenter for measurement, NPD prepared by direct conversion sintering under ultrahigh pressure at ultrahigh temperature was used. A spherical indenter having a spherical tip was pressed against a surface of a sample (a surface of a test piece) perpendicularly, and as shown in FIG. 1, with a tensile stress applied to the surface of the test piece, a load applied to the indenter was continuously increased (from 0 to 50 N), and the load applied to the indenter when the sample cracked was measured as a crack initiation load. The cracking was sensed by an AE sensor (a detector) installed on the sample stage (a test table). When the sample cracks, a signal is emitted at a frequency unique to a material of the sample. Accordingly, by analyzing a frequency of an acoustic signal measured by the AE sensor, a noise was separated from the signal, as shown in FIG. 2, to determine the cracking. In order to perform measurement in Hertzian elastic contact area, a state of a stress of the surface of the sample when the indenter's diameter and the load were changed was estimated through simulation, and for BL-PcBN, R is equal to 200 μm. For a diamond material having a hardness of at least twice that of cBN, a plurality of indenters of NPD were prototyped within a range of R=30 μm or more, which does not allow a sample to be plastically deformed thorough a simulation, and R=100 μm or less allowing a range within a maximum load of 200 N applicable in the present experiment system to brittly fracture the sample, and an optimal indenter diameter was selected through an experiment.

3. Method of Experiment 3.1. Evaluation Sample (Test Piece)

A BL-cBN sample used in the present evaluation test was synthesized from high-purity isotropic hBN and pyrolytic BN(pBN) as starting materials through direct conversion under a variety of types of conditions of 8 to 20 GPa and 1500 to 2300° C. An NPD sample was prepared from high-purity graphite different in crystallinity as a starting material through direct conversion under a similar, variety of types of synthesis conditions. These samples' compositions were confirmed through X-ray diffraction (XRD) and had their structures observed with a scanning electron microscope (SEM) to determine a grain size. Three types of synthetic single crystal diamonds HPHT-synthesized and having different nitrogen concentrations, and two types of natural single crystal diamonds were used in the experiment. The single crystal diamonds all had a (100) crystal plane subjected to evaluation. Each sample was formed into a plate, and BL-PcBN was wet-polished with diamond abrasive grains and NPD and single crystal diamond were dry-polished with a metal bonded diamond grinding wheel to have a surface roughness adjusted to be Ra equal to or smaller than 2 nm for evaluation.

3.2. Evaluation Method

After an NPD indenter having a predetermined size was brought into contact with a sample, a load increased at 1 N/sec was applied to crack the sample. After that, a signal of the AE sensor installed on the sample table was sampled and analyzed in frequency to determine a crack initiation load. In addition, how the sample cracked was observed with a laser microscope, and how a ring crack was caused was confirmed.

3.3. Result and Discussion (1) BL-PcBN

The present evaluation was applied to two types of BL-PcBNs having different structural grain sizes depending on a difference between their starting materials. It has been confirmed that both had a ring crack formed outside a portion at which the indenter came into contact as shown in the concept shown in FIG. 1, and that both had cracked by tensile stress caused in an elastically deformed region. Further, a result has been obtained indicating that a fine grain material which was synthesized with pBN serving as a starting material and had a grain size of 30 to 50 nm cracked under a load larger by 30% or more than BL-PcBN having a grain size of 50 to 100 nm.

Figure 3:
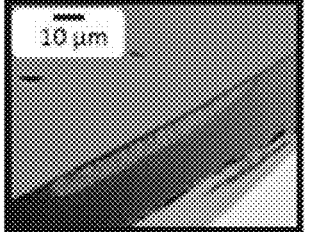
FIG. 3 is a table representing a correlation between a crack initiation load and cutting performance.
Figure 3:
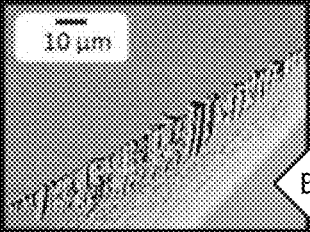
Figure 3:
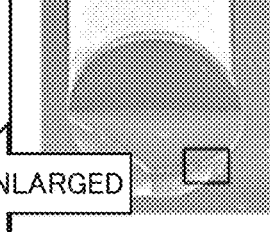

Then, these two types of BL-PcBNs were used to create ball end mills of R=0.5 mm which were in turn used to cut high hardness steel material of ELMAX (HRC60). Under cutting conditions of n=60000 rpm, ap=5 μm, ae=3 μm and Vf=200 mm/min with a cutting length of 24 m, a fine, small area was processed to have a mirror finished surface, and after the cutting, amounts by which cutting edges were worn were compared. From an observation of cutting edges of tools with an SEM after cutting, as shown in FIG. 3, a BL-PcBN tool with a grain size of 30 to 100 nm had fine chipping, and from the chipping to a flank of the tool, a streaky wear mark was observed. In contrast, a tool made from a fine grain material having a grain size of 30 to 50 nm and cracking under a high load had no substantial chipping observed, and exhibited high performance as a tool. These results revealed that a strength evaluation by this method has a correlation with a property of a tool.

(2) NPD

Prototyped indenters having R=30-100 μm were used to measure crack initiation loads for a single NPD sample. Low measurement values were obtained for indenters of small diameters of R=30 μm and R=40 μm, and an indenter with R=70 μm provided a measurement error as large as about twice. An indenter having a small diameter was difficult to process and thus had an insufficiently precise shape resulting in a sample cracking under a small load. An indenter having a large diameter required a large load, and accordingly, the indenter had a problem in terms of durability, resulting in reduced measurement accuracy. From these results, it has been found that an NPD indenter with R=50±5 μm and a roundness equal to or smaller than 0.05 μm was able to be used to measure a diamond material in strength with an error of ±15% or less. It has been confirmed through an evaluation of a variety of types of NPDs with different grain sizes, as well as BL-PcBN, that the finer a grain size is, the better a crack initiation load is.

(3) Single Crystal Diamond

Figure 4:
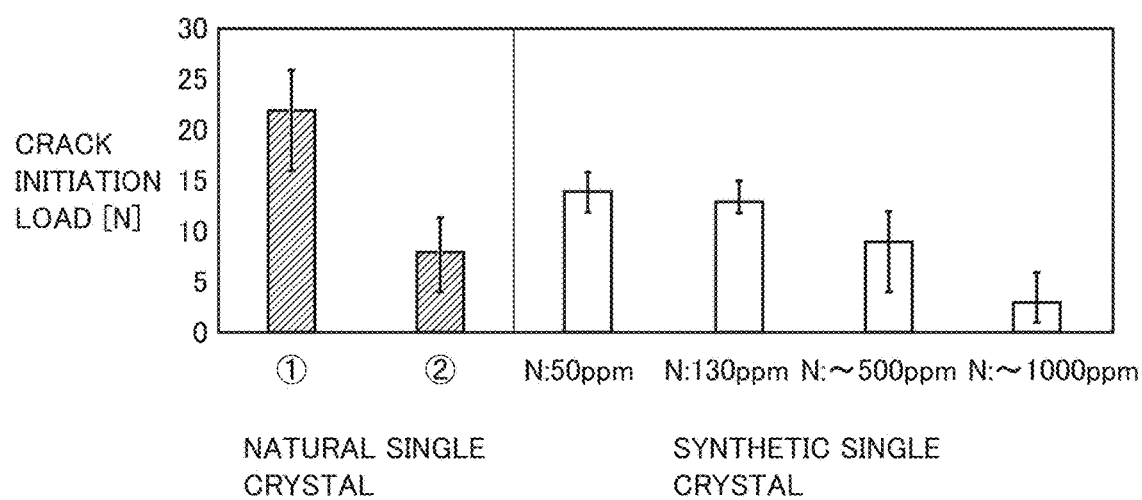
FIG. 4 is a graph representing loads cracking a variety of types of single crystal diamonds serving as test pieces.

An NPD indenter having R=50 μm was produced and used for evaluation for a variety of types of single crystal diamond materials. Single crystal diamond had a ring crack influenced by cleavage and thus formed in a square parallel to the (110) direction. As shown in FIG. 4, natural diamond (type Ia) cracks under a load which has a difference of three times or more between individuals and there is also a significant variation for a single sample. In contrast, it has been observed that synthetic single crystal diamond (Ib type) with a larger amount of impurity nitrogen tended to crack under a smaller load. Samples with a nitrogen content of 100 ppm or less have been found to have stable strength characteristics with a variation of ±10% or less between individuals as well as between samples. The present evaluation method has made it possible to quantitatively evaluate single crystal diamond's strength characteristics having been difficult to evaluate. Further, the method allows evaluation in a fine, small area, and it is also possible to quantify a difference in characteristics depending on impurity in a single single-crystal or a difference in how crystal strain is made therein.

4. Conclusion

A novel strength evaluation method to evaluate anti-crackability against tensile stress in an elastic contact area has been developed by a strength evaluation method by indentation using an R indenter made of NPD. It has been confirmed that this method can quantitatively evaluate an effect that a difference in grain size of BL-PcBN or NPD, impurity of single crystal diamond, or a difference in a state of a defect has on strength characteristics.

Thus while embodiments and examples of the present invention have been described, it is also initially planned to combine configurations of the embodiments and examples, as appropriate.

It should be understood that the embodiments and examples disclosed herein have been described for the purpose of illustration only and in a non-restrictive manner in any respect. The scope of the present invention is defined by the terms of the claims, rather than the embodiments and examples described above, and is intended to include any modifications within the meaning and scope equivalent to the terms of the claims.

The invention claimed is:

1. An indenter made of polycrystalline diamond and having a tip having a spherical surface with a radius of 10 to 2000 μm, wherein the spherical surface of the tip is a portion with a roundness measured according to JIS B 0621 of 0.001 μm or more and 0.05 μm or less.

2. The indenter according to claim 1, wherein the spherical surface of the tip is a portion with a surface roughness Ra measured according to ISO 25178 of 0.0001 μm or more and 0.03 μm or less.

3. The indenter according to claim 1, wherein the polycrystalline diamond further includes boron.

4. The indenter according to claim 3, wherein the proportion of the boron is 100 ppm or more and less than 10000 ppm.

5. A method for evaluating a load which cracks a test piece including a hard material having a diamond-like crystal structure, comprising the steps of:
fixing the test piece at a predetermined location and bringing a tip of the indenter according to claim 1 into contact with a surface of the test piece;
applying a load increasing with time to the indenter in a direction perpendicular to the surface of the test piece toward the surface of the test piece; and
recording a load applied when the test piece has the surface cracked by the indenter.

6. The method according to claim 5, wherein the hard material includes diamond or cubic boron nitride.

7. The method according to claim 5, further comprising:
in the step of applying a load to the indenter, detecting a frequency spectrum of oscillation of the test piece, and
in the step of recording the load, removing a signal of a noise component, based on a frequency of a threshold preset in order to separate a signal attributed to cracking and a signal attributed to the noise component, to detect and record the signal attributed to the cracking.

8. An evaluation apparatus for evaluating a load which cracks a test piece including a hard material having a diamond-like crystal structure, comprising:
- an indenter according to claim 1;
- a test table allowing a test piece including a hard material having a diamond-like crystal structure to be fixed thereto at a predetermined location;
- a load application unit configured to apply a load increasing with time to the indenter in a direction perpendicular to a surface of the test piece toward the surface of the test piece;
- a detector configured to detect a frequency spectrum of oscillation of the test piece; and
- a recorder configured to record the load and the frequency spectrum.

* * * * *